(12) United States Patent
Beneker et al.

(10) Patent No.: US 7,552,000 B2
(45) Date of Patent: Jun. 23, 2009

(54) COCKPIT OF AN AUTOMOTIVE VEHICLE WITH A STEERING WHEEL AND AN ADJUSTABLE SEAT

(75) Inventors: Wilfried Beneker, Leichlingen (DE); Stefan Lingnau, Solingen (DE)

(73) Assignee: C. Rob Hammerstein GmbH & Co. KG, Solingen (DE)

( * ) Notice: Subject to any disclaimer, the term of this patent is extended or adjusted under 35 U.S.C. 154(b) by 689 days.

(21) Appl. No.: 10/931,904

(22) Filed: Sep. 1, 2004

(65) Prior Publication Data
US 2005/0043877 A1 Feb. 24, 2005

(30) Foreign Application Priority Data
Sep. 8, 2003 (DE) .............................. 103 41 690

(51) Int. Cl.
*G06F 7/00* (2006.01)
(52) U.S. Cl. .......................... 701/49; 701/45; 180/268; 280/735
(58) Field of Classification Search .................. 701/49, 701/1, 45, 41, 46; 180/268, 271; 280/734, 280/735
See application file for complete search history.

(56) References Cited

U.S. PATENT DOCUMENTS

| | | | | |
|---|---|---|---|---|
| 5,292,178 A | * | 3/1994 | Loose et al. | 297/344.1 |
| 5,555,502 A | * | 9/1996 | Opel | 701/36 |
| 6,240,347 B1 | * | 5/2001 | Everhart et al. | 701/36 |
| 6,388,655 B1 | * | 5/2002 | Leung | 345/157 |
| 6,571,154 B2 | * | 5/2003 | Worrell et al. | 701/1 |
| 6,830,123 B2 | * | 12/2004 | Ohki et al. | 180/326 |
| 2002/0091473 A1 | * | 7/2002 | Gardner et al. | 701/35 |
| 2002/0188393 A1 | * | 12/2002 | Yokota et al. | 701/45 |
| 2004/0209594 A1 | * | 10/2004 | Naboulsi | 455/404.1 |

* cited by examiner

*Primary Examiner*—Gertrude Arthur Jeanglaud
(74) *Attorney, Agent, or Firm*—Novak Druce + Quigg; J. Rodman Steele, Jr.

(57) ABSTRACT

A passenger compartment (cockpit) of an automotive vehicle is equipped for the driver with a steering wheel (20), with an underbody (24), and with a seat (26). The seat (26) comprises an underframe (28) connected to the underbody (24), a seat pan (30) carried by the underframe (28), a seat back (32) and an adjusting device for adjusting the seat (26) toward the steering wheel (20) and away therefrom. A control circuit (56) is associated with said adjusting device.

15 Claims, 3 Drawing Sheets

Figure 1:
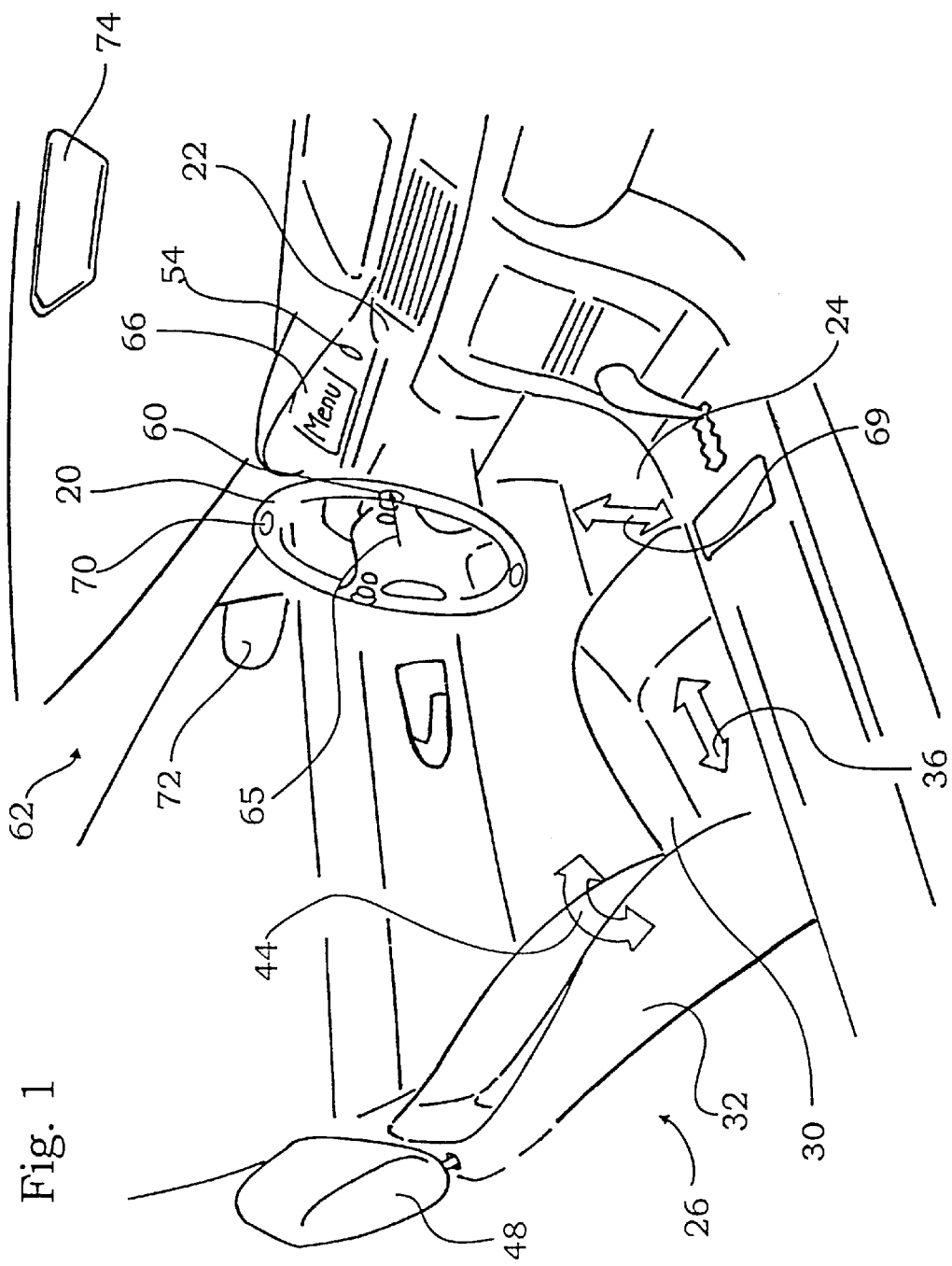

COCKPIT OF AN AUTOMOTIVE VEHICLE WITH A STEERING WHEEL AND AN ADJUSTABLE SEAT

The invention relates to the driver's compartment (cockpit) of an automotive vehicle with a) a steering wheel, with b) an underbody, with c) a seat, said seat comprising an underframe connected to said underbody, a seat pan carried by the underframe, a seat back and an adjusting device for adjusting the seat toward the steering wheel and away therefrom, a control circuit being associated with said adjusting device.

Nowadays, the seats of modern automotive vehicles are equipped with a plurality of adjusting devices such as for lengthwise adjustment, for height adjustment of the seat front edge, for tilt adjustment of the seat back, for upward and downward headrest adjustment, for forward and backward headrest adjustment, for height adjustment of a seat pan, and so on. According to prior art, a switch is associated with every single adjusting device for actuating the same. Said switches are for example disposed on one side of the seat, it is also known to dispose and configure the switches so that they form a small seat that can be actuated by adjusting it in the manner wanted for the actual seat. Further, prior art memory mechanisms are known by means of which several users may store their individually defined seat positions so that the seat can be returned to these positions after it has been displaced.

In prior art, purely mechanically-operated adjusting devices are known that are brought purely mechanically from the normally locking state into an enabling state e.g., lengthwise adjustment devices. The invention does not relate to such type adjusting devices. It relates to adjusting devices in which at least switching from the normal locking state to the adjustable state can be electrically triggered. It preferably relates to motor driven, more specifically to electric motor driven adjusting devices.

The purpose of the invention is to simplify adjustment of a seat in an automotive vehicle. Its object is to develop the previously known passenger compartments so as to permit a particularly evident setting of the passenger compartments and to more specifically achieve an evident setting of the adjusting possibilities for the seat.

The solution to this object is achieved in that there is provided an input means permitting to selectively bring the control circuit from the normally locked state into an activated state, the adjusting device of the seat being adjustable in the activated state only, that sensors which are connected to the control circuit are disposed on the steering wheel, at least one first sensor being responsive to a first force exerted in the direction leading away from the seat toward the steering wheel and at least one second sensor being responsive to a second force exerted onto the steering wheel in the direction opposite to said first force and that the first sensor controls an adjusting backward movement of the adjusting device which is thus moved away from the steering wheel and the second sensor controls an adjusting forward movement of the adjusting device which is thus moved toward the steering wheel.

In accordance with the invention, the at least one adjusting device is moved in the very direction in which the user pushes himself away from the steering wheel or pulls himself closer toward said steering wheel. Accordingly, the direction of movement or the force exerted by the user which are associated to the adjustment wanted are respectively made use of. If a user wants to adjust his seat so that a portion of the seat is moved backward and, as a result thereof, substantially away from the steering wheel, he accordingly pushes himself away from the steering wheel thereby almost automatically actuating the at least one associated sensor so that rearward seat adjustment is thus achieved. If the user wants to move forward, he pulls himself, and with him the seat, toward the steering wheel, thereby actuating at least one second sensor so that a corresponding adjusting movement is completed in the desired direction.

The various adjusting movements are thereby previously enabled, and as a result thereof made possible, by the control circuit. The control circuit has at least one adjusting mode. If it is selected, the at least one adjusting device can be moved for adjustment. Preferably, several adjusting devices are provided and the control circuit has several adjusting modes that are preferably sequentially offered to the user or that can be selectively chosen by him. The great advantage of the invention is that the adjusting device is haptically controlled. The user performs the very movement he wants the seat pan to be adjusted to execute. This makes adjustment evident and easily understandable. The invention is preferably suited for adjusting devices that operate in a direction substantially leading toward the steering wheel and away therefrom.

In a development, the overall device can also be designed in such a manner that other adjusting devices may additionally be operated without the user exerting directly a force between the part to be adjusted and the sensors. An adjustable, motor-driven mirror may thus for example be adjusted through the sensors, the same applying to tilt adjustment of the steering wheel, actuation of a car radio and so on. Adjusting devices of the seat that are substantially oriented from the top toward the bottom such as for example the height adjustment of the seat front edge may also be enabled. Additional sensors may be provided on the steering wheel for this purpose, said sensors registering e.g., that the steering wheel is being tilted about a horizontal axis and accordingly controlling the adjusting movement. The sensors preferably utilized are strain gauge devices or other force sensors. They permit to detect the for example substantially vertical upward or downward movement of the steering wheel initiated by the user holding the steering wheel in the normal position, meaning with the hands in the 3 o'clock and 9 o'clock position. This direction of movement is substantially parallel to the height adjustment of the front edge of the seat or to the height adjustment of a headrest for example. In as much, the association is evident in this case as well.

Figure 2:
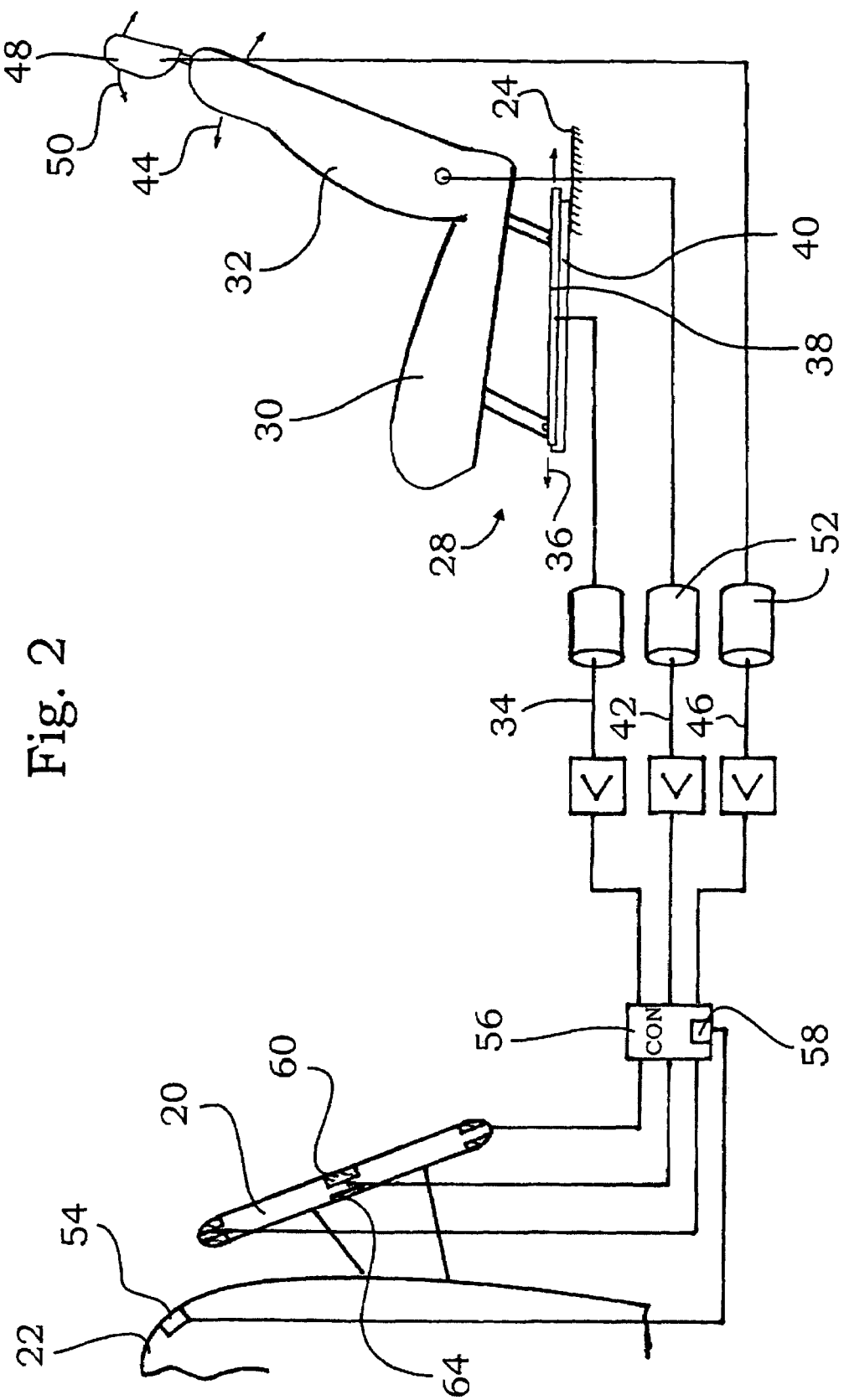
Figure 3:
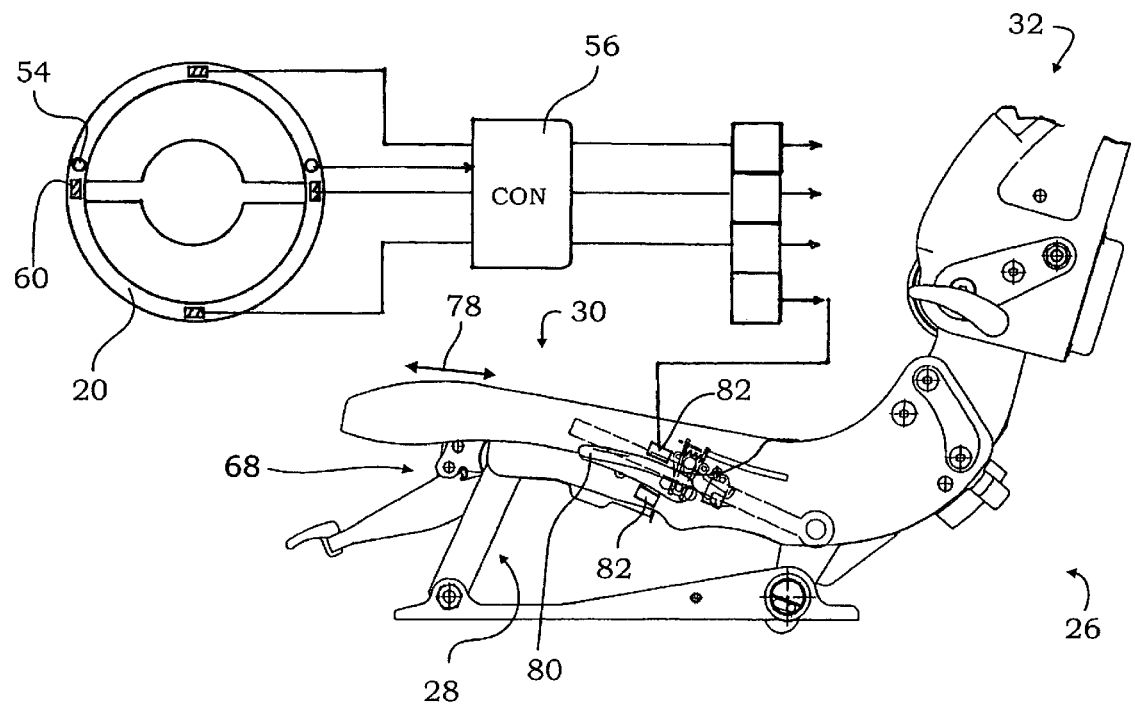

Further advantages and characteristics of the invention will become apparent upon reading the remaining claims and the following non restrictive description of embodiments thereof, given by way of example only with reference to the drawing. In said drawing:

FIG. 1 is a perspective inside view of a cockpit as viewed for example by a front-seat passenger, FIG. 2 is a side view of a steering wheel with the associated portion of the console and with an electric circuit in the form of a block diagram, and FIG. 3 is a top view of a steering wheel with two push buttons serving as input means and one mechanically adjustable seat.

FIG. 1 shows a driver's compartment or cockpit of an automotive vehicle. The cockpit comprises a steering wheel 20 projecting from a dashboard 22. The cockpit further has an underbody 24 and a seat 26. The latter has an underframe 28 (see FIG. 2) that is connected to the underbody 24, a seat pan 30 that is carried by the underframe 28 and a seat back 32. The seat has a plurality of adjusting devices, three different adjusting devices taken among this plurality of adjusting devices being shown in FIG. 2. A lengthwise adjustment device 34 is provided. It permits to displace the seat rail 38 on each seat side relative to the respective one of the floor rails 40 on each seat side in the direction pursuant to the double-headed arrow 36. The floor rail 40 is connected to the underbody 24. There is further provided a tilt adjusting device 42 for tilt adjustment of the seat back 32, the adjustment being performed pursuant to the double-headed arrow 44. Such type adjusting devices are known in principle, see e.g., U.S. Pat. No. 5,275,457 and U.S. Pat. No. 6,299,252. There is eventually provided a forward and backward adjusting device 46 for a headrest 48, the adjustment being performed pursuant to the double-headed arrow 50.

All of the three adjusting devices 34, 42, 46 are equipped with an electric motor 52 each, as can be seen from the schematic illustration thereof shown in FIG. 2.

An input means 54 is provided on the dashboard 22, in the instant case it is implemented as a microphone for voice input and control which will still be discussed in closer detail hereinafter.

A control circuit 56 that is connected to all of the adjusting devices 34, 42, 46 is provided. Its basic functions are similar to those of the prior art memory devices for seat adjustment. It moreover has additional functions that will be explained in closer detail hereinafter.

The input means 54 is connected to the control circuit 56 and is provided additionally for this purpose with a microphone amplifier and a speech evaluation circuit 58. Two first sensors 60 are disposed on the steering wheel 20 that is in the position in which the automotive vehicle is traveling in a straight line. They are located on the surface of the ring of the steering wheel 20, said surface being substantially directed toward the seat 26 and, as a result thereof, opposing the normal direction of travel of the automotive vehicle 62. A first sensor 60 is in the 9 o'clock position and another first sensor 60 is in the 3 o'clock position, meaning they are disposed respectively completely to the left and completely to the right on the steering wheel. Second sensors 64 are respectively disposed exactly opposite. They are mounted to the surface of the steering wheel ring that is turned away from the seat 26. They are accordingly directed substantially in the direction of travel. The first sensors 60 are separated from the second sensors 64 by the thickness of the steering wheel ring only. The sensors 60, 62 are located at the very site at which the driver's right and left hand typically rest on, and take hold of, the steering wheel ring. The ball of the thumb or the thumb of each hand rests on the first sensor 60 while the base of the four fingers substantially rests on the second sensor 64.

In their simplest configuration, the sensors 60, 64 are switches e.g., membrane switches as they are known from the computer sector, or microswitches or the like. Such type sensors only perform the simple function of switching on and off, so that they correspond to a single-break switch. They are only enabled above a certain pressure as this is in principle known for switches.

As shown in FIG. 2, the various sensors 60, 64 are connected to the control circuit 56. It is indicated at CON. Adjustment of the seat proceeds as follows:

At first, the control circuit 56 is brought from its normally locked state into its activated state. It is activated through the input means 54. For this purpose, the user must enter a corresponding input. He may for example enter a standardized speech command "select seat position". He may also be asked by a speech output whether he would like to select a seat position with the control circuit being activated, meaning the adjusting state being selected, when the user answers "yes". The user may also enable a switch and so on. In principle, the adjusting devices 34, 42, 46 can only be adjusted after unlocking. No adjustment can be made in the locked state.

The control circuit 56 now offers in sequence three adjusting modes. It first offers the adjusting mode for the lengthwise adjustment device 34. This is rendered by spoken output or displayed on a screen 66 or in another way. The user now knows that he can actuate the lengthwise adjusting device 34. Adjustment is performed via the sensors 60, 64. If the user wants to adjust the seat 26 backward pursuant to the double-headed arrow 36, he must actively dictate this movement, meaning he must build up a force between the hands resting on the steering wheel 20 and the back resting on the seat back 32. He thus actuates at least one of the two first sensors 60. The control circuit 57 registers the switching process of at least one of the two first sensors 60 and controls the lengthwise adjustment device 34 in such a manner that the two seat rails 38 of the pairs of rails are displaced backward relative to the floor rails 40. Adjustment is thereby performed by the associated electric motor 52. Adjustment will be performed as long as the user keeps at least one first sensor 60 switched on.

As soon as the backward adjustment of the seat has been achieved, the user reduces the force he exerts onto the steering wheel 20 so that the two first sensors 60 are in the off-state. The control circuit registers this and accordingly stops the lengthwise adjustment device 34.

If however the user has pushed the seat too far to the back and wants to move it slightly forward again, he will pull on the steering wheel 20. As a result, at least one of the two second sensors 64 will be switched to the on-state. The control circuit 56 now actuates the lengthwise adjustment device in the opposite direction until the pressure onto the second sensor 64 is again reduced.

In order to switch to the next adjusting mode, namely the one for tilt adjustment of the seat back 32, an appropriate step must be performed. In the exemplary embodiment shown, the control circuit displays on the screen 66 the question "lengthwise adjustment completed?". If the user audibly answers "yes" the control circuit passes to the next operation mode, namely the tilt adjustment of the seat back 32. The process is actually the same as before. If the user wants to further recline the seat back 32 backward, he will push himself back thereby pushing against at least one of the two first sensors 60. The control circuit 56 registers this switching state and sends to the tilt adjusting device 42 the control command to become operative. The electric motor 52 adjusts the tilt of the seat back accordingly as long as the sensor is actuated.

The third adjusting mode is achieved accordingly, with the adjusting device 46 for the head rest 48 being now addressed.

The existing vehicle seats need not be modified for the implementation described so that prior art vehicle seats may be used. The invention requires modifications of the steering wheel 20, the input means 54 and the control circuit 56.

The adjusting devices 34, 42, 46 discussed herein above have adjustment directions that are substantially oriented toward and away from the steering wheel 20. Here, the user applies a force onto the steering wheel 20 and the reaction force onto the corresponding part e.g., the seat back 32, the direction of the force exerted by the user substantially coincides with the adjustment direction. In the other adjusting devices, this is nolonger the case in this pure form. These other adjusting devices will now be discussed hereinafter:

An example for another adjusting device is an adjusting device 68 for adjusting the height of the front edge of the seat, which will be referred to hereinafter as SFE-adjusting device 68. The adjustment is performed pursuant to the double-headed arrow 69 (FIG. 1). Again, prior art seats can be used, the seat itself will not have to be modified for the invention. In principle, the first and the second sensors 60, 64 can be used for the SFE-adjusting devices 68. It has been found however that it is more advantageous to provide further sensors. In FIG. 2 for example, sensors are respectively provided on the side of the steering wheel 20 that is turned toward the seat as well as on the side turned away therefrom in the 12 o'clock and in the 6 o'clock position of said steering wheel 20, they are referred to as third sensors 70. Upon actuation thereof, the front edge of the seat is adjusted in an manner analogous to that described herein above. For this purpose, a fourth control mode is provided in the control circuit 56.

In this embodiment, the user must however change the position of his hands, at any rate the position of at least one hand, on the steering wheel 20. He must be apprised of this before, though. It has therefore been found out that it is advantageous to configure the third sensors, and preferably all of the sensors as sensors capable of measuring the force, for example as strain gauge devices, also referred to as SGs. Said sensors record, i.a., the forward and backward tilt of the steering wheel 20 about a horizontal axis, an upward or downward movement of the steering wheel 20 respectively and/or any other force acting upon the steering wheel 20. The same effect is achieved as with the sensors 60, 64, 70 shown in FIG. 2 and which are configured there as switch sensors. In the present case however, the user must no longer move his hands to place them onto the sensors, he only needs to tilt, push, pull the steering wheel upward or downward and so on.

There are still further adjustment possibilities as can be seen more specifically from FIG. 1. This Figure still shows an outside rearview mirror 72 and an inside rearview mirror 74 that are adjustable by being motor-driven, both being adjustable about two different pivoting axes. The inclination of the steering column may also be adjustable. In the control circuit 56, corresponding adjusting modes are provided for these adjustments. If they are active, adjustment can be performed by actuating corresponding sensors on the steering wheel 20. Here again, force sensors are advantageous because they are capable of recording any force applied onto the steering wheel by the user. The recording of the forces applied to the steering wheel can be controlled in such a manner that it corresponds to the movements the user would complete if he were to adjust directly the mirror by holding it directly with both hands placed on the left and on the right side of the mirror. This permits to very advantageous assignment of the movements transmitted to the steering wheel 20 so that the mirror is adjusted in accordance with the forces exerted onto said steering wheel 20.

FIG. 3 shows a steering wheel that is substantially equipped with strain gauge devices forming the sensors 60, 64, 70. Such type sensors can be disposed anywhere on the steering wheel 20, also in or on the steering column, provided they record in the best possible way the forces acting onto the steering wheel only. In the embodiment in accordance with FIG. 3, the input means 56 is realized by two push-button switches 54. As long as at least one of these buttons is pressed down, for example by the thumb of a user, the control circuit 56 is in the activated state. Releasing the push button 54 can be used for passing to the next adjusting mode and/or for selecting the locked state of the control circuit 56.

FIG. 3 further shows a seat the adjusting device of which has no motor and is adjustable by the adjusting force applied by the user. Such type seats are also suited for the invention. The tilt of the front and rear parallelogram bars is adjustable. As a result, the seat pan is adjusted pursuant to the double-headed arrow 78. The adjusting device is described in the patent application "Adjustable vehicle seat, more specifically integrated seat" that was filed today by the same applicant, this application being fully incorporated herein by reference and the entire application being intended to be included in the disclosure of the present application.

The normally locked adjusting device is unlocked by pivoting a hand lever 80. If said hand lever is pivoted in a direction of rotation, adjustment is allowed to occur in one direction of the double-headed arrow 78. Two electromagnets 82 perform the same function as the hand lever, a respective one of them being responsible for allowing adjustment to be performed in one direction of the arrow. Said electromagnets are activated by the control circuit 56. If one magnet is actuated, the seat pan can be adjusted, the user having to apply the adjusting force.

Hereto before, serial interrogation or serial operation of the various adjusting modes has been described. It is absolutely possible to enable several adjusting devices simultaneously. Accordingly, in a first adjusting mode, at least two, but possibly all, adjusting devices of the seat are for example enabled. By applying the corresponding force onto the steering wheel 20, the user initiates the desired movement. It has thereby been found advantageous to enable the elements one by one, for example the vehicle seat, the outside rearview mirror, the inside rearview mirror, the steering column or a radio.

Where the application speaks of a sensor being disposed on a side of the steering wheel that is turned toward the seat, it substantially intends to describe its function; in fact, the sensor may also be disposed somewhere else provided it is responsive only to a pressure that is applied approximately at the site where the first sensor is intended to be positioned in accordance with the description, meaning for example in the 3 o'clock and in the 9 o'clock position. This more specifically relates to sensors that are configured to be force sensors e.g., SGs. Sensors that are configured to be merely switches are by contrast to be disposed preferably on those sites onto which a user applies the force, meaning for example pursuant to arrow 65.

One of the sensors 60, 64, 70 can also be used as an input means 54. For this purpose, an appropriate signal is to be agreed upon with the control circuit 56, e.g., a pressure exerted onto the steering wheel in one direction during three seconds will unlock the control circuit 56.

What is claimed is:

1. A passenger compartment (cockpit) of an automotive vehicle comprising
    a steering wheel,
    an underbody, and
    a seat,
    said seat comprising
        an underframe connected to said underbody,
        a seat pan carried by the underframe,
        a seat back,
        a first adjusting device for adjusting the seat toward the steering wheel and away therefrom,
        a control circuit associated with said first adjusting device,
        an input means permitting to selectively bring the control circuit from a normally locked state into an activated state, wherein the first adjusting device of the seat is adjustable only in the activated state,
        sensors located on the ring of the steering wheel and connected to the control circuit, at least one first sensor of these sensors being responsive to a first force exerted in the direction leading away from the seat toward the steering wheel and at least one second sensor of these sensors being responsive to a second force exerted onto the steering wheel in the direction opposite to said first force, said first sensor controlling an adjusting backward movement of the adjusting device which backward movement is a movement away from the steering wheel and said second sensor controlling an adjusting forward movement of the adjusting device which forward movement is a movement towards the steering wheel.

2. The passenger compartment in accordance with claim 1, characterized in that the first adjusting device for the seat is one of a lengthwise adjustment device and/or an adjusting device for adjusting the tilt of the seat back and/or an adjusting device for adjusting the longitudinal position of a headrest and/or an adjusting device for adjusting the position of the seat pan in the longitudinal direction.

3. The passenger compartment in accordance with claim 1, characterized in that the seat comprises more than one adjusting device and that the control circuit comprises either several control modes and is designed in such a manner that each of the adjusting devices can be addressed selectively via the input means or one control mode by means of which several adjusting devices of the seat are controllable simultaneously.

4. The passenger compartment in accordance with claim 1, characterized in that the first sensor and the second sensor are disposed on the steering wheel so as to be within the range of the user's hands holding the steering wheel.

5. The passenger compartment in accordance with claim 1, characterized in that the input means comprises a sensor.

6. The passenger compartment in accordance with claim 1, characterized in that the first adjusting device comprises either a releasable mechanical locking device or a drive with an electric motor.

7. The passenger compartment in accordance with claim 3, characterized in that the steering wheel comprises at least one third sensor and at least one further adjusting device for the seat, the adjusting movement thereof substantially occurring in a direction other than the direction leading toward the steering wheel and away therefrom.

8. The passenger compartment in accordance with claim 1, characterized in that either the at least one first sensor enables in the control circuit, upon actuation by the hand of a user, switching between an on-state and an off-state, or the at least one first sensor is a force sensor.

9. The passenger compartment in accordance with claim 8, characterized in that the force exerted onto the force sensor is evaluated in the control circuit in such a manner that the speed of the adjusting movement is also controlled, a larger force applied on the sensor resulting in a faster adjusting movement and vice versa.

10. The passenger compartment in accordance with claim 3, characterized in that it further comprises at least one additional part, wherein said at least one additional pan is associated with a second adjusting device, wherein said control circuit comprises an adjusting mode for actuating said second adjusting device and wherein at least one third sensor, which is provided on the steering wheel and can be identical to the first or second sensor, is associated with a control unit of said second adjusting device.

11. The passenger compartment in accordance with claim 10, characterized in that the at least one additional part is a mirror or a steering wheel adjusting facility.

12. The passenger compartment in accordance with claim 5, characterized in that the input means is a switch or a voice input.

13. A passenger's compartment (cockpit) of an automotive vehicle comprising:
   a steering wheel, said steering wheel comprising a ring, said ring having a front ring face and a back ring face,
   an underbody,
   a seat, said seat comprising an underframe connected to said underbody, a seat pan carried by the underframe, a seat back, a first adjusting device for adjusting the seat toward the steering wheel and away therefrom, the front ring face facing forward, the back ring face facing backward toward the seat,
   a control circuit associated with said first adjusting device, characterized in that there is provided an input means
   an input means permitting to selectively bring the control circuit from the normally locked state into an activated state, wherein the first adjusting device of the seat is adjustable only in the activated state,
   sensors located on the a ring of the steering wheel and connected to the control circuit, at least one first sensor of these sensors being arranged on said back ring face, and being responsive to a first force exerted in the direction leading away from the seat toward the steering wheel and at least one second sensor of these sensors being arranged on said front ring face, and being responsive to a second force exerted onto the steering wheel in the direction opposite to said first force, said first sensor and said second sensor being disposed on the steering wheel so as to be within the range of the user's hands holding the steering wheel, said the first sensor controlling an adjusting backward movement of the adjusting device which backward movement is a movement away from the steering wheel and said second sensor controlling an adjusting forward movement of the adjusting device which forward movement is a movement towards the steering wheel.

14. The passenger compartment in accordance with claim 13, wherein said first sensor is located directly opposite said second sensor.

15. The passenger compartment in accordance with claim 13, characterized in that the input means is not combined with the sensors, and that the input means is arranged at a distance from the sensors outside the user's hand range holding the steering wheel.

* * * * *